Dec. 19, 1944.  H. A. LIVINGSTON  2,365,283
PERPETUAL INVENTORY DEVICE
Filed Feb. 18, 1943  2 Sheets-Sheet 1
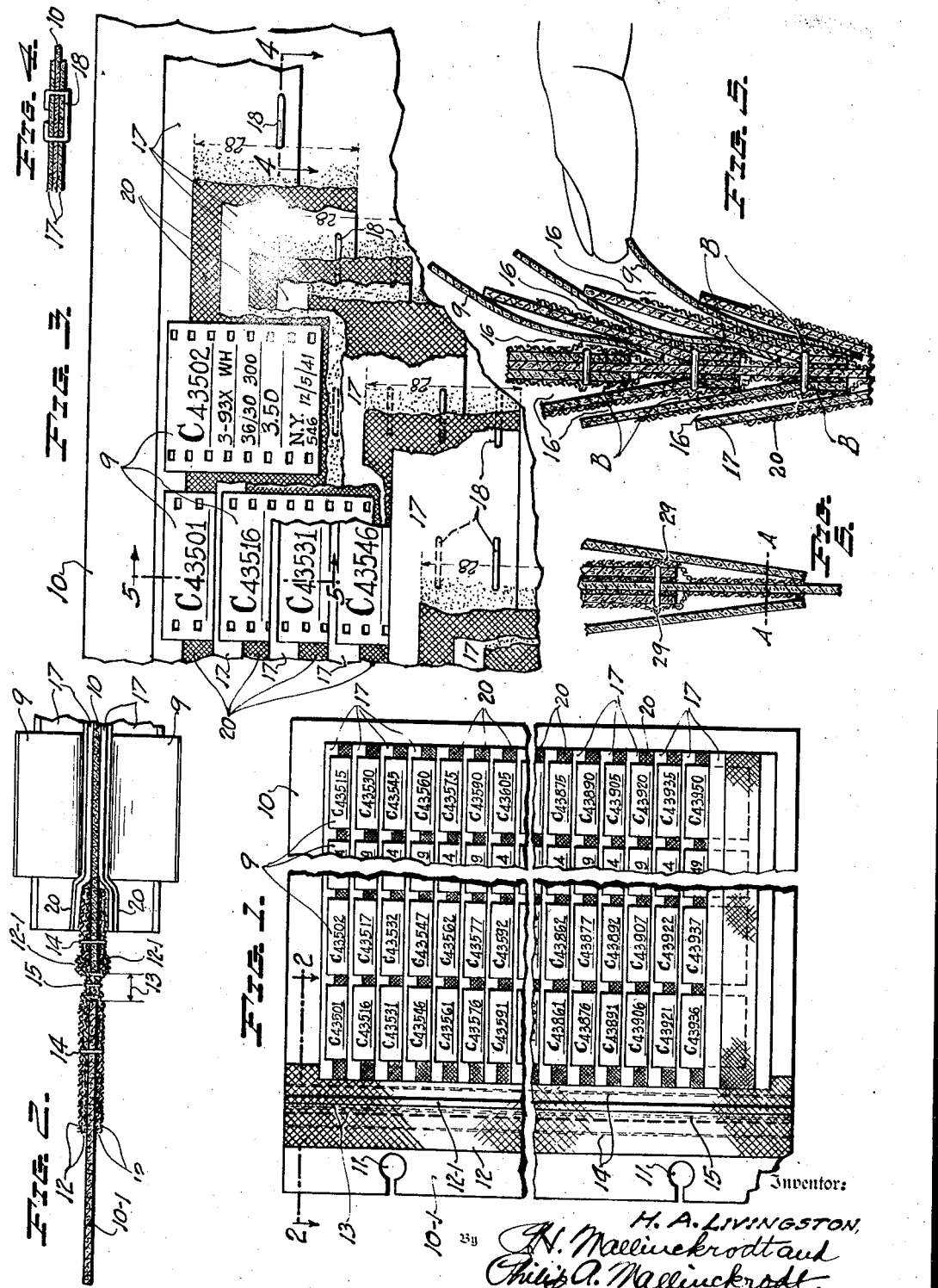
Inventor:
H. A. LIVINGSTON,
Attorneys.

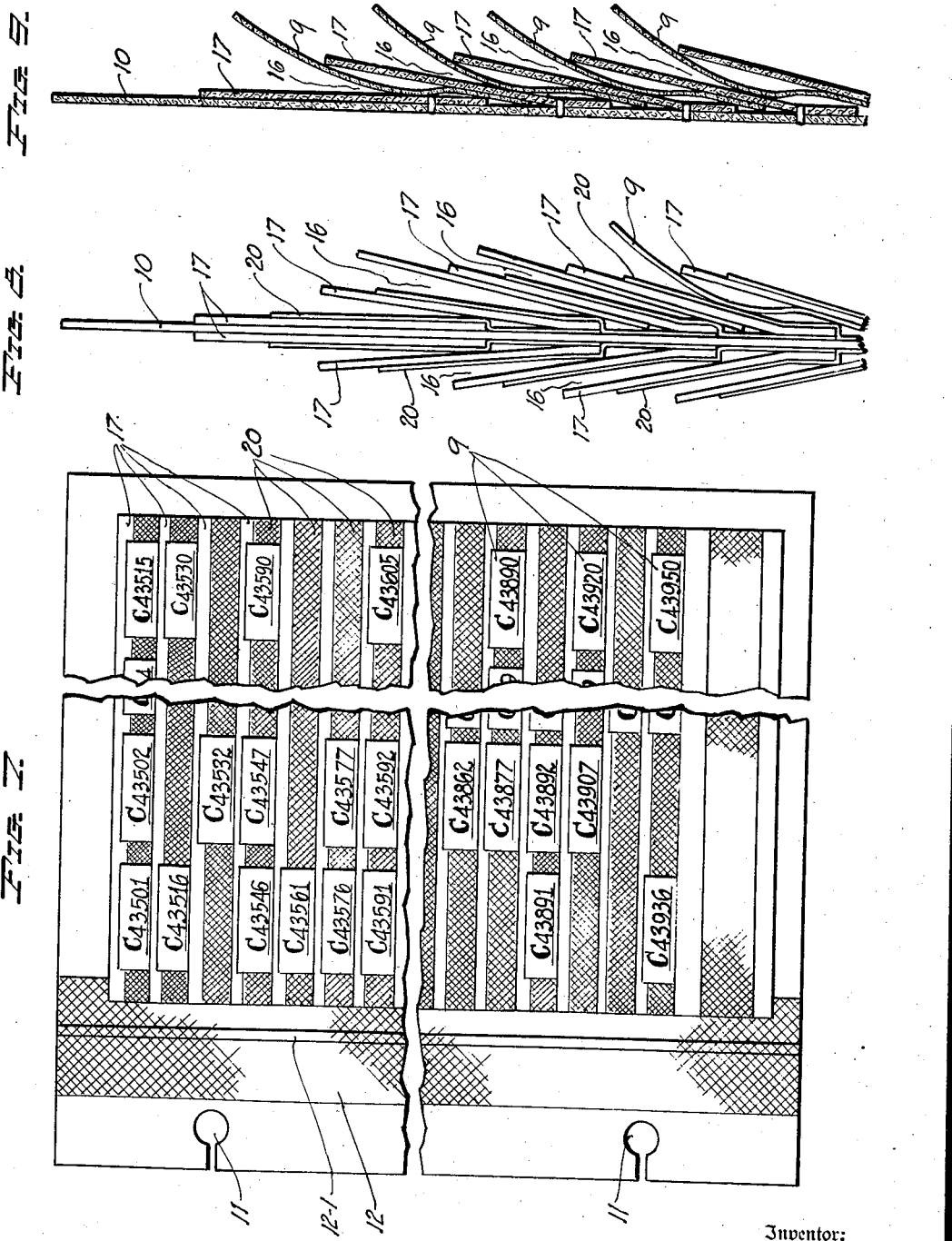

Patented Dec. 19, 1944

2,365,283

UNITED STATES PATENT OFFICE 2,365,283

PERPETUAL INVENTORY DEVICE

Harold A. Livingston, Hollywood, Calif.

Application February 18, 1943, Serial No. 476,250

4 Claims. (Cl. 129—20)

This invention relates to devices arranged for removably retaining items of record, such as tags, cards, prints, or items of a similar flat nature capable of being quickly inserted in and removed from receiving compartments or pockets.

In particular, the invention relates to devices of the type specified, which are of sheet or leaf formation, capable of being bound together in the form of a book, preferably of the loose-leaf type, so that a complete, or at least a voluminous, record may be continuously maintained within a relatively small space.

The invention applies especially to the keeping of an orderly, up-to-the-minute inventory in a business establishment or the like, wherein stock on hand of variously sized, or otherwise differing articles is being continually depleted during the course of business and must be replenished in order that the stock be completely representative of a "line" of goods, usually merchandise of one sort or another, such as wearing apparel. As thus applied, the invention may be considered as providing a perpetual inventory device.

The principal objects of the invention are to provide:

First: A device that makes possible the keeping of an inventory up-to-the-minute.

Second: An inventory record adapted to show at a glance the condition of an inventory from day to day.

Third: An inventory record whereby the individual articles of merchandise in an extensive and varied stock can be rapidly and conveniently ascertained.

Fourth: A device that makes it possible to immediately note the need for restocking an article that has passed out of stock.

Fifth: A record device that is simple and convenient to operate.

Sixth: An inventory record that is accurate and reliable even if manipulated by unskilled persons.

Seventh: An inventory record that eliminates human fallibility to a maximum degree.

Eighth: A holder for record items or the like which affords quick and easy insertion of the individual record items into, and removal thereof from, any part of the holder, and which securely retains such record items in place during use.

In some lines of merchandising it is not only desirable, but absolutely necessary, that the merchant know accurately at all times the inventory status of his stock if he is to conduct his business profitably. An example of such a line is ladies' undergarments, and more particularly, brassières. As a result of having to supply many different styles and many different sizes in each style, the line of one manufacturer may contain hundreds and even thousands of different articles. A merchant cannot afford to carry more than one or a few articles of each different specification, but must still see that his stock is substantially complete from day to day if he is not to lose sales.

In order to record inventory stock rapidly and accurately, a photographic recording machine is used to photograph tags attached to numerous individual articles of an inventory individually on a traveling strip of sensitized film in one-shot exposures.

The tags are advantageously numbered consecutively for record purposes. Each article is thus represented and identified by a distinct number, which appears preferably at the head of its corresponding tag photograph. The tag photograph contains in addition to the number, other data, such as style number, lot number, size, price, and so on, appertaining to the particular article under consideration.

In due time the film is developed, and, in printing the negative, the prints may be enlarged to any requisite size.

By means of the present invention, the individual photographic prints are rendered usable for the inventory purposes hereinbefore described. To this end, the invention provides an assembling record item holder, including, advantageously, a stiff fiber-board sheet having compartments or pockets for displaying the prints in such a way that at least the characteristic tag number of each individual print is clearly and instantly readable.

Sale of any article is followed immediately by the removal from the holder of the print which corresponds to the tag carried by the article sold. If the individual, consecutively numbered prints are assembled side-by-side and consecutively in the holder, a glance at the record device will suffice to apprise a person of the exact condition of the inventory. Removal of a print leaves a blank space in the holder, and indicates that the particular article bearing the tag which corresponds to the print has been sold. The removed print bears all the data necessary for replenishing the stock, and may be used as a memorandum for the purpose.

Other indexing and filing devices may be used in conjunction with the inventory record device of the invention to provide a complete and perpetual inventory record system. The nature of such auxiliary devices may differ according to the type of business and inventory concerned. For example, it may be desirable to post the complete data from each tag photograph in a card index system, to a card of which is applied the date of sale of the particular article concerned and other pertinent information not appearing on the tag or on the photographic print of the tag. But, in all instances, the several recording devices making up the complete inventory record system will be correlated, one with the others, so the system may be used as a unit.

Since insertion of the individual prints in and removal thereof from the record holder of the invention is usually effected many times during the course of business, and is desirably accomplished rapidly, the record holder should be adapted structurally for the purpose.

Accordingly, and pursuant to the invention, the print-receiving compartments or pockets of the holder are preferably formed in multiple by securing the lower edges of pocket-forming strips to a base sheet in such manner as to provide a tight friction grip for the prints adjacent the secured edges of the strips. These pocket-forming strips are preferably left so the upper portions thereof may be flexed outwardly from the base sheet to release, or at least to ease, the friction grip and thus facilitate removal of one or more of the prints. It is desirable that protective strips be provided internally of each pocket for covering the securing means employed in the forming of a next higher pocket, so there will be no obstructing projections internally of the pockets. Such protective strips are desirably of such a nature as will enhance the normal friction grip of the pockets on the received prints at the lower portions thereof, thereby insuring against movement of the prints relative to one another within such receiving pockets, without interfering with or slowing the insertion of the prints in and removal thereof from the holder.

Further objects and features of the invention will be apparent from the following detailed description of the preferred specific embodiment illustrated in the accompanying drawings.

In the drawings:

Fig. 1 represents a plan view of one face of a sheet or leaf of a loose-leaf inventory record book pursuant to the invention, all the record items being in place, but intermediate portions of the holder being broken out for convenience of illustration;

Fig. 2, a fragmentary section taken on the line 2—2, Fig. 1, and considerably enlarged;

Fig. 3, an enlargement of a fragment of the sheet or leaf of Fig. 1, certain hidden parts being exposed by breaking away structure in the foreground;

Fig. 4, a fragmentary section taken on the line 4—4, Fig. 3;

Fig. 5, an enlarged fragmentary section taken on the line 5—5, Fig. 3, wherein both faces of the item holder appear, record items being positioned within the pocket of only that face which appears in Figs. 1 and 3;

Fig. 6, a view corresponding to that of Fig. 5, but illustrating how a spring-clamping action is imparted to the item holder;

Fig. 7, a view corresponding to that of Fig. 1, but slightly enlarged and showing several of the record items removed in accordance with inventory depletion;

Fig. 8, a fragmentary end elevation of that portion of the record device which is illustrated in Fig. 5, emphasizing the advantageous combination produced by the use of roll-type photographic prints as compared with ordinary flat tags or the like; and Fig. 9, a view corresponding to that of Fig. 5, but illustrating a somewhat modified embodiment of item holder pursuant to the invention.

The inventory record of the invention is provided by a plurality of individual record items, here indicated 9, so assembled and arranged as to form a visual pattern representative of a stock of goods on hand, see Fig. 1. The several record items are individually removable from and replaceable in the visual pattern, thus making it possible to keep the inventory record up-to-the-minute, see Fig. 7. Accordingly, the visual pattern is constantly indicative of the condition of an inventory during the course of business.

One or more other record devices (not illustrated), such as a card index system, record journal, and the like, may be used in conjunction with the visual pattern of the instant device, so that a ready reference is provided, affording complete inventory data corresponding to the respective members of the visual pattern.

As stated hereinbefore, the individual record items are advantageously photographic prints of identifying tags which are usually attached to articles of merchandise, and, besides data identifying the article and giving pertinent facts concerning the same, such as style, size, price, cost, etc., bear special indicia particularly for inventory purposes. The respective indicia of all the prints are correlated, making possible the intelligible, visual pattern above mentioned.

It is preferable that the indicia comprise consecutive numbers, each print bearing one of the numbers, and that the several prints be disposed in side-by-side relationship with the inventory numbers exposed and arranged consecutively, as shown, thereby forming a visual pattern which is intelligible at a glance.

Generically speaking, the visual pattern may be provided in a variety of different ways, the individual record items and the means for assembling the same may be of any construction affording the desired results, namely, the formation of an intelligible, easily read, visual pattern which may be varied to suit the changing conditions of an inventory, and which is representative of the various articles making up the inventory.

In the case of the photographic prints above mentioned, and of any similar inventory items, it is advantageous that the assembling or mounting means be a holder of sheet formation provided with receiving pockets.

The illustrated holder comprises a sheet 10 of relatively stiff material, such as hard fiber board, capable of holding its sheet formation under the load of attached pocket structure and of received, extraneous, record items. The sheet 10 should be as thin as is consistent with the maintaining of proper rigidity, so as to keep structural bulk to a minimum.

Since it is often desirable to group a number of the item holders together in order to accommodate a large inventory, it is advantageous that the sheets be equipped for loose-leaf binding into book formation.

A preferable and novel loose-leaf construction is illustrated in Figs. 1 and 2. Here, a marginal binder strip 10—1, perforated as at 11, to receive the usual rings or posts of a conventional loose-leaf binder (not shown) is tightly, yet articulatively, secured to the back margin of holder sheet 10 by means of fabric strips 12. There are advantageously two or more of the fabric strips 12 at each side of the joinder crack 13, formed between the abutting edges of holder sheet 10 and binder strip 10—1, and such fabric strips may be adhesively secured together and to the adjoining surfaces of the holder sheet and binder strip, as by means of glue, leaving, however, wrinkles 12—1 at both faces of the joinder crack 13 adjacent the back edge of holder sheet 10, so that holder sheet 10 may be freely swung relative to the binder strip 10—1.

In order to make the resulting joinder rugged, one or more lines of thread stitching 14 are advantageously provided laterally of the joinder crack 13, and at least one similar line of stitching 15 is provided at and along the joinder crack 13. The stitching 14 binds together the fabric strips and holder sheet 10, in one instance, and the fabric strips and binder strip 10—1 in the other instance, while the stitching 15 completes, in effect, a strong hinge joint between the holder sheet and binder strip.

A plurality of receiving pockets 16, see especially Fig. 5, are formed transversely across the width of holder sheet 10, extending from top to bottom thereof in substantially parallel relationship, by securing to either one or both faces of such holder sheet 10 (both faces in the present instance) a corresponding plurality of elongated stiffly resilient strips 17. It is preferred that these pocket-forming strips 17 be of relatively thin and hard fibre board, since this material has been found to possess the desired property of stiff resiliency in a very suitable degree.

The pocket-forming strips 17 are secured adjacent their lower edges, and along the lengths thereof, to the holder sheet 10, and are preferably arranged in overlapping relationship in order to provide a considerable number of pockets 16 over the face or faces of the holder sheet. The overlapping arrangement also accomplishes another purpose, as explained hereinafter.

The securement is desirably effected by wire staples 18 placed at intervals along the lengths of the respective strips, although other means, such as thread stitching or even strong adhesive, may conceivably be employed. The wire staples, however, are especially advantageous because of their relative inflexibility and positive holding action, see Fig. 4. The positive anchorage of the respective pocket-forming strips along lines substantially parallel with the lower edges of such strips, see Fig. 3, provides clean-cut lines of bend along the lengths of the strips, which, because of the resiliency of the strips, enables the individual record items 9 to be wedged firmly into place during insertion, and insures positive holding action thereon following insertion.

The stapling is accomplished as shown in Fig. 6, where the line A—A represents the line of insertion of a single staple which, in this instance, simultaneously binds two pocket-forming strips 17 at opposite faces of the holder sheet 10, see also Fig. 4. Should pockets 16 be desired on only one face of the holder sheet 10, somewhat smaller staples may be employed, as illustrated in Fig. 9.

It should be noted in Figs. 5 and 6 that the overlapping arrangement of the pocket-forming strips 17 provides respective elongated, intermediate clamping zones, indicated B, within the pockets 16 between the secured lower margins and the upper edges of the pocket-forming strips 17. Securing of the lower margins of such pocket-forming strips tightly to the face or faces of the holder sheet 10, means that the remainder of the resilient pocket-forming strips will be urged under spring tension toward such face or faces of the holder sheet 10, resulting in the creation of the above-mentioned elongated clamping zones B along the lower edges of these pocket-forming strips which are respectively disposed immediately above other pocket-forming strips. Thus, the record items 9 are effectively and automatically clamped into place intermediate their lower and upper edges immediately upon being inserted within the receiving pockets 16—this being in addition to the holding action exerted upon their lower margins by the bottoms of the pockets. Stapling at A—A causes spring action on bearing 29.

In order to facilitate insertion of the record items 9 within the receiving pockets 16 and removal of such record items therefrom, the lateral sides or ends of the pocket-forming strips 17 are left free, unsecured to the holder sheet 10, see Fig. 8. Accordingly, and because of the resilient nature of the pocket-forming strips 17 and of their overlapping arrangement on the holder sheet 10, the upper portions of such pocket-forming strips do not bear tightly against the face or faces of the holder sheet 10, but project slightly outwardly therefrom, providing open entrance to the receiving pockets 16 at all times, see especially Figs. 5, 8 and 9. The resulting V-formation of the receiving pockets 16 favors quick and positive insertion of the record items 9 through the relatively wide mouth, and downwardly, into securely clamped positions within the pockets. Removal of such record items from the pockets is accomplished readily by the user of the record device by merely applying the finger-tips to flex the pocket-forming strips 17 farther outwardly, thereby loosening the clamping action thereof on the record items. This latter action is possible, of course, because the lateral sides or ends of the pocket-forming strips 17 are free and unsecured.

It should be noted that, when a plurality of these record item holders are bound together in the form of a record book, the pocket-forming strips 17, together with the contents of the receiving pockets 16, are pressed flat against the holder sheets 10 while the record book is closed, thus making for compactness.

It is desirable that the staples 18 be covered so there will be no interference to insertion of the record items within the receiving pockets. This is preferably accomplished by applying elongated strips 20 of gummed fabric tape to the face or faces of the holder 10 along the lines of stapling. Such cover strips 20 also, desirably, serve as friction strips for enhancing the holding action of the pockets 16 on the record items 9. The usual gummed fabric tape is advantageous, because it possesses a relatively rough, woven face which provides a considerably greater frictional coefficient than does the smooth, hard face of the fibre board holder sheet 10. Nevertheless, such woven face is sufficiently hard to allow the record items 9 to be easily slipped thereover during insertion.

It can be seen, however, that the cover strips 20 may be of any material which provides the desired cover for the staples 18 or which provides both the cover and the friction grip for the received record items. Also, friction strips may be advantageously provided even though some means of securement other than the staples 18 be employed.

The strips 20, whether they be merely cover strips or both cover and friction strips, are preferably wider than the pocket-forming strips 17, and it is desirable that they be disposed with their lower edges substantially even with the lower edges of the next lower pocket-forming strips, see Fig. 3. In this way, and because of the overlapped arrangement of the pocket-forming strips, these adhesive strips 20 cover the staples 18 of respective pocket-forming strips 17, and are themselves securely stapled between the holder sheet 10 and the respective pocket-forming strips which are next below those whose securing staples 18 are covered. This means that the entire structure of the item holder is strongly reinforced and securely tied together. At least some of the zones of adhesiveness of the strips 20 are indicated at 28. This construction insures a high degree of structural integrity.

While the use of cover or cover-friction strips is advantageous, it is not absolutely necessary. Fig. 9 illustrates an embodiment in which the staples are not covered.

The record items 9 are illustrated as photographic prints of individual identifying tags of the type customarily applied to articles of merchandise. Such photographic prints result from the use of the photographic recording machine mentioned hereinbefore, and are somewhat arcuate in form, as illustrated, the effective face thereof being concave. The arcuate formation follows naturally from the making on a roll of paper, of a sequential series of positive prints from a sequential series of negative exposures formed on a roll of motion picture film by use of the above-mentioned photographic recording machine, the individual prints being severed from the rolled strip of prints. Fig. 3 illustrates these photographic prints as they actually appear, with sprocket holes along lateral edges thereof, but in Figs. 1 and 7 the sprocket holes are omitted for sake of convenience of illustration.

These arcuately-formed photographic prints provide an ideal inventory record device when mounted in the item holder of the invention, since their peculiar configuration cooperates with the receiving pocket structure of such item holder to enhance their friction fit within the receiving pockets, see especially Figs. 5 and 8, and to facilitate their removal from the receiving pockets. By comparing in Fig. 8 the position of the flat tag 25 within its receiving pocket 16, with the position of any one of the arcuately formed photographic prints 9 within their respective receiving pockets 16, the advantages of the roll-type photographic prints, in combination with the item holder, can be easily seen. The curved intermediate portion 9a of each of such photographic prints normally hugs the inner surface of its receiving pocket 16, bearing against a friction strip 20, if such is provided, while the upper edge portion 9b curves outwardly from the item holder, so it may be quickly and easily grasped by the user of the record device for the purpose of removing the print when required, see the finger 30 in Fig. 5.

Whereas this invention has been illustrated and described with respect to certain preferred specific embodiments thereof, it should be understood that various changes may be made in such embodiments and various other embodiments may be constructed by those skilled in the art without departing from the spirit and generic purview of the invention as set forth herein and in the claims which here follow.

I claim:

1. An inventory record device, comprising a holder of sheet formation; and a plurality of substantially identically configurated record items disposed in side-by-side relationship within said holder, forming a visual pattern indicative of the condition of an inventory, said holder comprising a substantially rigid holder sheet, a plurality of stiffly resilient pocket-forming strips arranged in substantially parallel, overlapping relationship, each strip extending transversely of the width of said holder sheet and being secured along its lower margin to said holder sheet, but being otherwise free and unsecured with its upper marginal edge free and unretained, so the said strip may be flexed outwardly from said holder sheet, wire staples securing the lower margins of said pocket-forming strips to said holder sheet, said record items being disposed within said receiving pockets in side-by-side relationship with upper portions thereof protruding beyond the upper marginal edges of the respective pocket-forming strips and outwardly of the said pockets, and friction strips covering the secured lower margins of said pocket-forming strips for sheathing the said wire staples and aiding in the retention of said record items by said receiving pockets.

2. A holder for record items comprising a substantially rigid holder sheet; a plurality of stiffly resilient pocket-forming strips arranged in substantially parallel, overlapping relationship, each strip extending transversely of the width of said holder sheet and being secured along its lower margin to said holder sheet, and each strip except the uppermost having its upper marginal edge portion overlapping the secured lower margin of the next upper pocket-forming strip but being otherwise free and unsecured, so the strip may be flexed outwardly from said holder sheet, said pocket-forming strips forming respective elongated receiving pockets extending transversely of the width of said holder sheet, each having a constantly open mouth, and each being adapted to receive a plurality of record items in side-by-side relationship; and friction strips covering the secured lower margins of said pocket-forming strips.

3. A holder for record items, comprising a substantially rigid holder sheet; a plurality of stiffly resilient pocket-forming strips arranged in substantially parallel, overlapping relationship, each strip extending transversely of the width of said holder sheet and being secured along its lower margin to said holder sheet, and each strip except the uppermost having its upper marginal edge portion overlapping the secured lower margin of the next upper pocket-forming strip but being otherwise free and unsecured, so the strip may be flexed outwardly from said holder sheet, said pocket-forming strips forming respective elongated receiving pockets extending transversely of the width of said holder sheet, each having a constantly open mouth, and each being adapted to receive a plurality of record items in side-by-side relationship; wire staples securing the lower margin of said pocket-forming strips to said holder sheet; and friction strips covering the secured lower margins of said pocket-forming strips and sheathing the said wire staples.

4. An inventory record device, comprising a holder of sheet formation; and a plurality of substantially identically configurated record items disposed in side-by-side relationship within said holder, forming a visual pattern indicative of the condition of an inventory, said holder comprising a substantially rigid holder sheet, a plurality of stiffly resilient pocket-forming strips arranged in substantially parallel, overlapping relationship, each strip extending transversely of the width of said holder sheet and being secured along its lower margin to said holder sheet, but being otherwise free and unsecured with its upper marginal edge free and unretained, so the said strip may be flexed outwardly from said holder sheet, said pocket-forming strips forming elongated receiving pockets extending transversely of the width of said holder sheet and said record items being disposed within said receiving pockets in side-by-side relationship with upper portions thereof protruding beyond the upper marginal edges of the respective pocket-forming strips and outwardly of the said pockets; and friction strips covering the secured lower margins of said pocket-forming strips for aiding in the retention of said record items by said receiving pockets.

HAROLD A. LIVINGSTON.